United States Patent
Stapleton

(10) Patent No.: US 11,787,313 B2
(45) Date of Patent: Oct. 17, 2023

(54) PULL-STRAP ASSEMBLY FOR VEHICLE SEAT

(71) Applicant: Brose Fahrzeugteile SE & Co. Kommanditgesellschaft, Coburg, Coburg (DE)

(72) Inventor: Dakota Stapleton, Flushing, MI (US)

(73) Assignee: Brose Fahrzeugteile SE & Co. Kommanditgesellschaft, Coburg, Coburg (DE)

( * ) Notice: Subject to any disclaimer, the term of this patent is extended or adjusted under 35 U.S.C. 154(b) by 58 days.

(21) Appl. No.: 17/574,014

(22) Filed: Jan. 12, 2022

(65) Prior Publication Data

US 2023/0219466 A1 Jul. 13, 2023

(51) Int. Cl.
*B60N 2/20* (2006.01)
*B60N 2/22* (2006.01)
*B60N 2/36* (2006.01)

(52) U.S. Cl.
CPC .............. *B60N 2/22* (2013.01); *B60N 2/20* (2013.01); *B60N 2/2245* (2013.01); *B60N 2/366* (2013.01)

(58) Field of Classification Search
CPC .......... B60N 2/20; B60N 2/22; B60N 2/2245; B60N 2/366
See application file for complete search history.

(56) References Cited

U.S. PATENT DOCUMENTS

| | | | | | |
|---|---|---|---|---|---|
| 6,132,000 | A * | 10/2000 | Tanaka | ................... | B60N 2/366 297/378.13 |
| 7,393,056 | B2 * | 7/2008 | O'Connor | .......... | B60N 2/01583 297/378.12 |
| 8,282,150 | B2 * | 10/2012 | Clor | ..................... | B60N 2/3079 296/65.09 |
| 8,287,037 | B2 * | 10/2012 | Sayama | ............... | B60N 2/3011 296/65.09 |
| 8,888,186 | B2 * | 11/2014 | Otsuka | ................. | B60N 2/3043 297/378.12 |
| 9,248,760 | B2 * | 2/2016 | Boy | ...................... | B60N 2/2245 |
| 9,809,135 | B2 * | 11/2017 | Elton | ................... | B60N 2/2356 |
| 10,239,426 | B2 * | 3/2019 | Kondrad | ................ | B60N 2/897 |
| 10,525,853 | B2 * | 1/2020 | Kubota | ..................... | B60N 2/36 |
| 10,675,996 | B2 * | 6/2020 | Hoyer | ...................... | B60N 2/20 |

(Continued)

FOREIGN PATENT DOCUMENTS

FR 2852272 A1 9/2004
GB 2425945 A 11/2006

(Continued)

OTHER PUBLICATIONS

Extended European Search Report for EP 2315179.1, dated Jun. 6, 2023, 33 Pages.

*Primary Examiner* — Syed A Islam

(74) *Attorney, Agent, or Firm* — Dickinson Wright PLLC

(57) ABSTRACT

A pull-strap assembly for actuating a recline mechanism of a vehicle seat includes a clevis having first and second pieces configured to snap into one another, wherein the pieces cooperate to define a cylindrical body and a cable connector. The assembly further includes a fixed anchor and a tension member having a fixed end connected to the anchor, an intermediate portion looped around the cylindrical body, and a free end. The clevis is configured to move towards the anchor responsive to the free end being pulled by a user to release the recline mechanism.

20 Claims, 3 Drawing Sheets

(56) References Cited

U.S. PATENT DOCUMENTS

| | | | |
|---|---|---|---|
| 10,882,455 B2* | 1/2021 | Sturza | B60N 2/3011 |
| 10,906,443 B2* | 2/2021 | Pasternak | B60N 2/20 |
| 11,052,791 B2* | 7/2021 | Lukacik | B60N 2/2356 |
| 11,142,101 B2* | 10/2021 | Jones | B60N 2/2227 |
| 11,400,854 B2* | 8/2022 | Beenen | B65D 90/0053 |
| 2013/0161993 A1 | 6/2013 | Otsuka et al. | |

FOREIGN PATENT DOCUMENTS

| | | |
|---|---|---|
| JP | H10323252 A | 12/1998 |
| JP | 2003102580 A | 4/2003 |
| JP | 2007062636 A | 3/2007 |
| JP | 2009083603 A | 4/2009 |
| JP | 2020121662 A | 8/2020 |

\* cited by examiner

PULL-STRAP ASSEMBLY FOR VEHICLE SEAT

TECHNICAL FIELD

The present disclosure relates to vehicle seats and more particularly to assemblies for actuating a seat recline mechanism.

BACKGROUND

A vehicle seat may include seat bottom, a seat back, and a recline mechanism configured to pivotally attached the seat back to the seat bottom. The recline mechanism normally holds the angular position of the seat back relative to the seat bottom, but, when released, allows the seat back to pivot relative to the seat bottom. In some instances, the recline mechanism allows the seat to be reclined backward, and in others, the recline mechanism allows the seat back to fold forward for storage. The recline mechanism may be manually actuated by a user, such as by pulling a lever.

SUMMARY

According to one embodiment, a pull-strap assembly for actuating a recline mechanism of a vehicle seat includes a clevis having first and second pieces configured to snap into one another, wherein the pieces cooperate to define a cylindrical body and a cable connector. The assembly further includes a fixed anchor and a tension member having a fixed end connected to the anchor, an intermediate portion looped around the cylindrical body, and a free end. The clevis is configured to move towards the anchor responsive to the free end being pulled by a user to release the recline mechanism.

According to another embodiment, a pull-strap assembly for actuating a recline mechanism of a vehicle includes a housing defining an interior and a clevis disposed in the interior and configured to move along a first axis. The clevis has a cable connection and defines an axle extending along a second axis that is orthogonal to the first axis. A pulley is rotatably supported on the axle. A tension member has a fixed end connected to an anchor, an intermediate portion trained around the pulley, and a free end disposed outside of the housing and configured to be pulled by a user, wherein the pulley is configured to rotate about the axle, and the clevis is configured to move along the first axis responsive to movement of the free end away from the housing.

According to yet another embodiment, a vehicle seat includes a seat bottom and a seat back pivotally connected to the seat bottom by a recline mechanism. A cable has a first end connected to the recline mechanism and a second end. A release assembly is associated with the recline mechanism and includes a housing, a clevis disposed in the housing and having a first portion connected to the second end of the cable and defining an axle, a pulley rotatably supported on the axle, an anchor, and a tension member having a fixed end connected to the anchor, an intermediate portion trained around the pulley, and a free end disposed outside of the housing and configured to be pulled by a user. Movement of the free end away from the housing causes the clevis to move towards the anchor to actuate the cable and release the recline mechanism.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
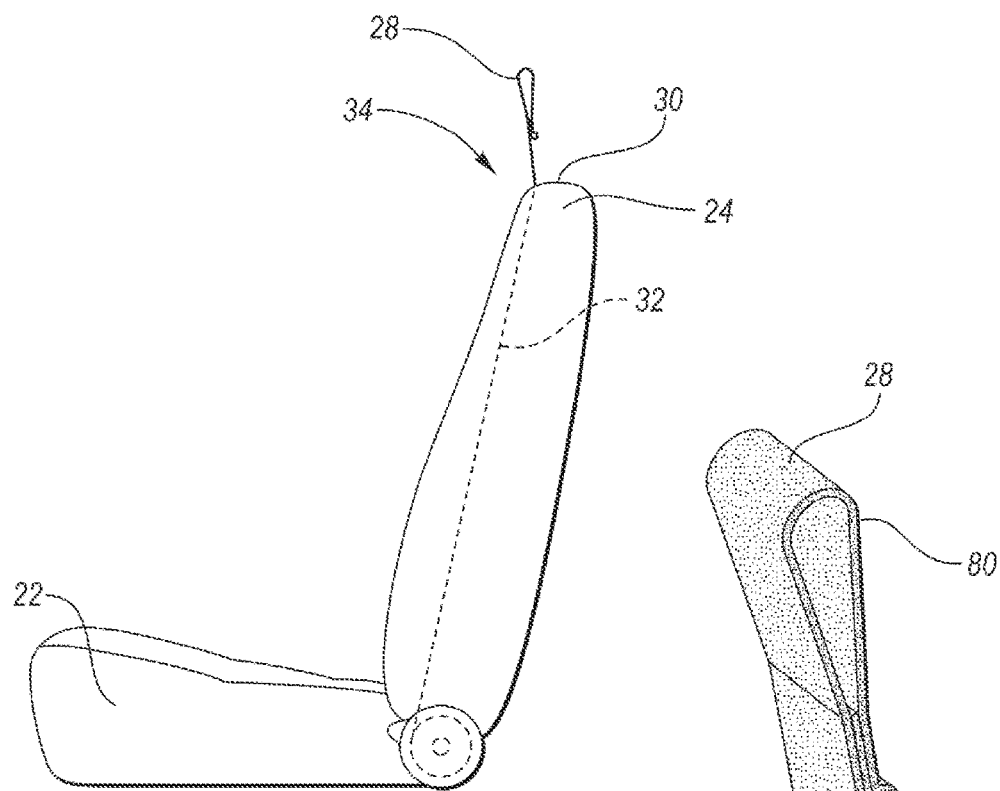
FIG. 1 is a schematic side view of a vehicle seat having a pull-strap assembly according to one or more embodiments of this disclosure.

Referring to FIG. 1, a vehicle seat 20 includes a seat bottom 22 and a seat back 24. The seat back 24 is pivotally attached to the seat bottom 22 allowing for different angles of recline and/or folding forward and/or folding flat. In the illustrated embodiment, the seat 20 is for a second or third row of the vehicle and is capable of a fold-flat position. The vehicle seat 20 may be attached directly to the floor or may be mounted on seat rails allowing fore-and-aft movement of the seat 20 relative to the vehicle floor.

One or more recline mechanisms (also known as recliners) 26, such as a pair of recline mechanisms, pivotally attach the seat back 24 to the seat bottom 22. A first component of the recline mechanism 26 is fixed to the seat bottom 22 and a second component of the recline mechanism 26 is fixed to the seat back 24. These first and second components are pivotal relative to each other about a recline axis of the seat. The recline mechanism 26 further includes a locking mechanism configured to lock the position of the first and second components to lock the angular position of the seat back 24. When the locking mechanism is in a locked position, the seat back 24 is fixed relative to the seat bottom 22, and when the locking mechanism is in an unlocked position, the seat back 24 may be pivoted about the recline axis. The recline mechanism 26 may be configured to allow the seat back 24 to recline backwards, fold forward, or both when the locking mechanism is actuated to one or more unlocked positions.

The recline mechanism(s) 26 may be manually released by a user. In the illustrated embodiment, a tension member 28, e.g., a pull strap, is provided near the top 30 of the seat back 24. While the tension member 28 is a pull strap in the illustrated embodiment, this disclosure is not limited thereto. In other embodiments, the tension member may be a cord, a cable, a rope, etc. The pull strap 28 is operably coupled to the recline mechanism(s) 26 by a tension member 32, such as a cable. The cable may be a Bowden cable. Pulling of the pull strap 28 causes the locking mechanism to move from a locked position to an unlocked position allowing the seat back 24 to pivot relative to the seat bottom 22. For example, the seat 20 may be configured to fold forward in response to the pull strap 28 being pulled. The pull strap 28 may be part of a pull-strap assembly 34 that is supported on the seat back 24.

Figure 2:
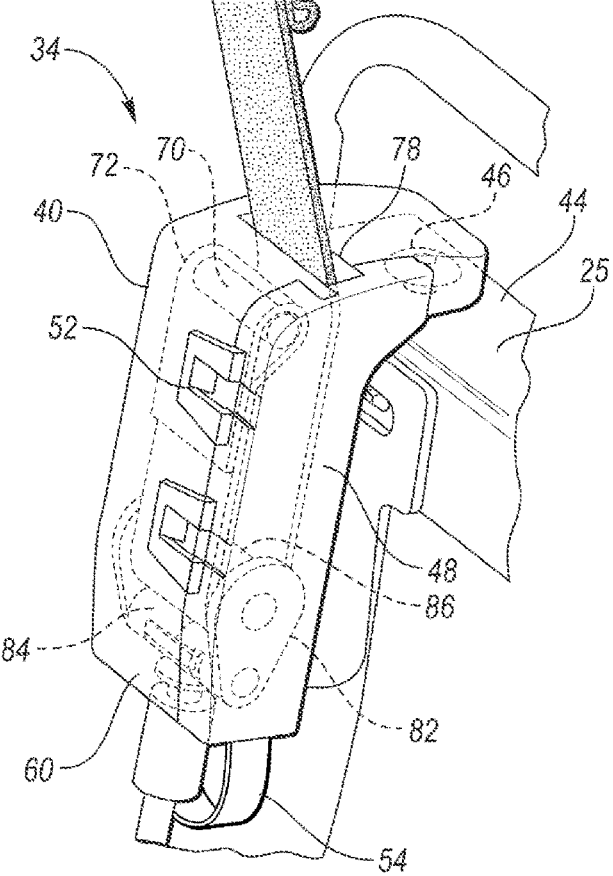
FIG. 2 is a perspective view of the pull-strap assembly attached to a seat frame.
Figure 3:
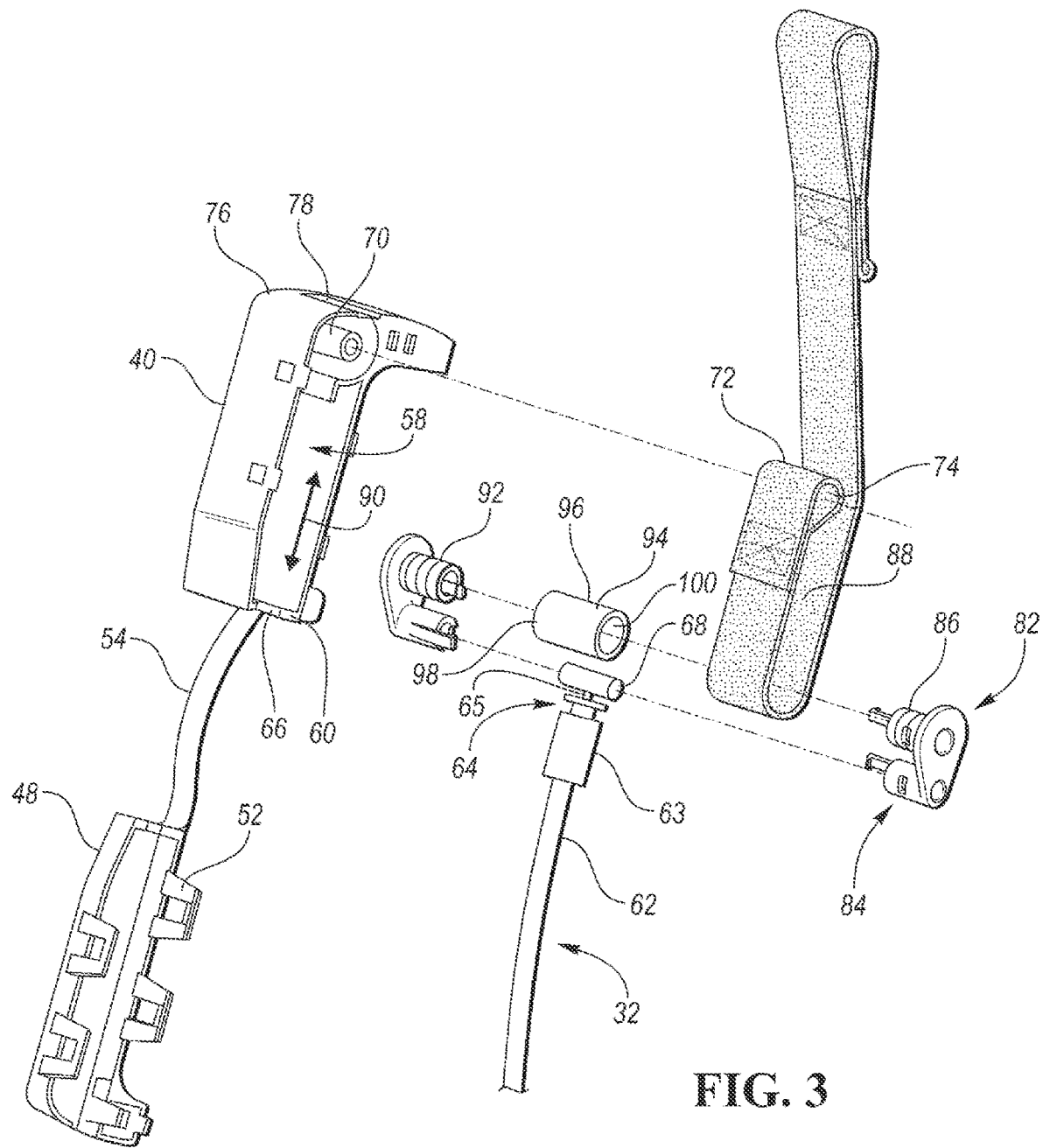
FIG. 3 is an exploded perspective view of the pull-strap assembly.

Referring to FIGS. 2 and 3, the pull-strap assembly 34 may include a housing 40 supported on an upper portion 25 of a frame 44 of the seat back 24. The housing 40 includes a mounting portion 42 that is configured to be attached to the frame 44 of the seat back by a fastener 46 or the like. The housing 40 includes an associated cover 48. The housing 40 and the cover 48 may be tethered to each other by a flexible connection 54, e.g., a living hinge. Clips 52 or other mechanism may be used to secure the cover 48 to the housing 40. The housing 40 defines an open cavity 58 that receives the components of the pull-strap assembly therein. A bottom wall 60 of the housing 40 defines a cable opening 66 that is configured to connect with the cable 32.

The housing 40 and/or the cover 48 may be formed of plastic. For example, the housing and/or the cover may be formed of injection molded plastic having suitable quality to form a class A surface. Alternatively, a trim bezel may be attached over the housing and cover.

The assembly 34 includes a strap anchor 70 that may be formed as part of the housing 40 or may be a stand-alone component that is secured within the housing. The strap anchor 70 may be a post as shown in the illustrated embodiment or any other design suitable of retaining a tension member in place, such as a clamp, a fastener, or the like. The anchor 70 is configured to connect with a fixed end 72 of the pull strap 28. For example, the fixed end 72 may include a loop 74 that is received on the post of the anchor 70. The pull strap 28 is configured to be received within the cavity 58 with the loop 74 secured around the anchor 70. An upper wall 76 of the housing 40 defines a strap slot 78 that allows the strap 28 to extend through the housing 40 so that the free end 80 can be pulled by a user.

The cable 32 includes an outer sleeve 62 having an end connector 63 that defines a groove 64. A wire 65 is slidably received within the outer sleeve and includes an end fitting 68, such as a T-bar, that is operably coupled to the strap 28. The other end of the wire 65 is operably coupled to the recline mechanism 26. The cable 32 may be secured to the housing 40 by inserting the groove 64 into the cable opening 66.

A clevis 82 is configured to connect the cable 32 to the strap 28. The clevis 82 includes a cable connection 84 configured to connect with the end fitting 68 and a strap connection 86 configured to connect with an intermediate portion 88 of the strap 28. The clevis 82, the intermediate portion 88, and the end fitting 68 are designed to float within the cavity 58 of the housing 40 such that the clevis 82 is movable along a first axis or direction 90. The cable 32 is biased to the retracted position by the recline mechanism 26 to normally place the clevis 82 near the bottom wall 60. Pulling the strap 28 causes the strap connection 86 to move (slide or roll) along the intermediate portion 88 towards the fixed end 72. This shortening of the strap 28 within the housing 40 pulls the clevis along the first direction 90 towards the anchor 70 thus pulling the wire 65 to disengage the locking mechanism(s) of the recline mechanism(s) and allow pivoting of the seat back 24. Once the seat back 24 reaches its intended position and the strap 28 is released by the user, the biasing of the cable 32 again pulls the clevis 82 back towards the bottom wall 60 retracting a portion of the strap 28 back into the housing 40.

In the illustrated embodiment, the clevis 82 and the strap 28 cooperate to form a pulley system that provides a mechanical advantage to reduce the pulling force needed to release the recline mechanism(s). Here, the strap connection 86 includes an axle 92 that supports a pulley 94, e.g., a drum pulley. The drum pulley 94 includes a hollow cylindrical body 96 having an outer circumferential surface 98 and an inner circumferential surface 100. The drum pulley 94 is supported for rotation on the axle 92 with the inner circumferential surface 100 disposed on the axle 92 and the outer circumferential surface 98 in rolling engagement with the intermediate portion 88 of the strap. The drum pulley 94 and the axle 92 are oriented orthogonal to the direction 90 allowing the drum pulley 94 to ride along the intermediate portion 88 of the strap during actuation. That is, an axial or longitudinal direction of the axle 92 and pulley 94 is orthogonal to the first axis 90. The drum pulley 94 is an optional component that helps to reduce friction between the clevis 82 and the strap 28 and provides smoothness. In an alternative embodiment, the axle 92 may directly engage with the strap 28.

Figure 4:
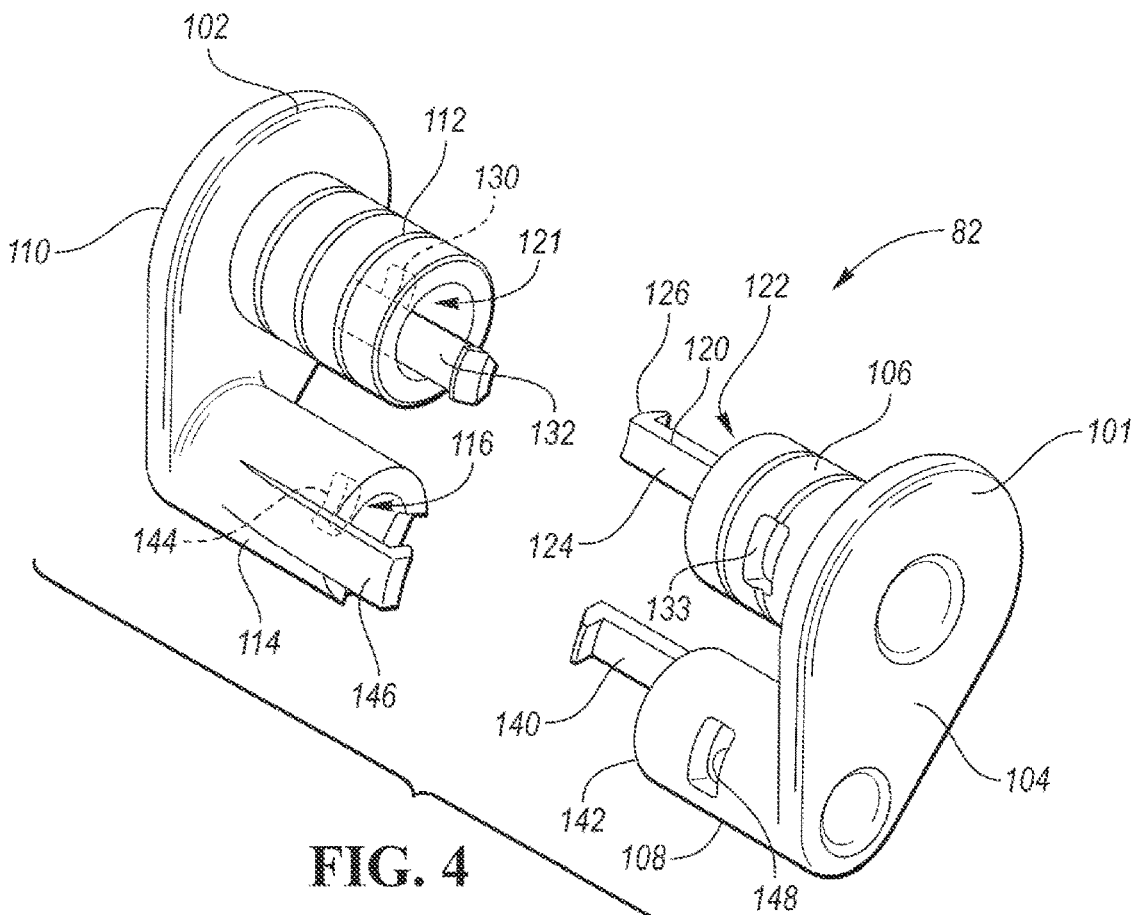
FIG. 4 is an exploded perspective view of a clevis of the pull-strap assembly.
Figure 5:
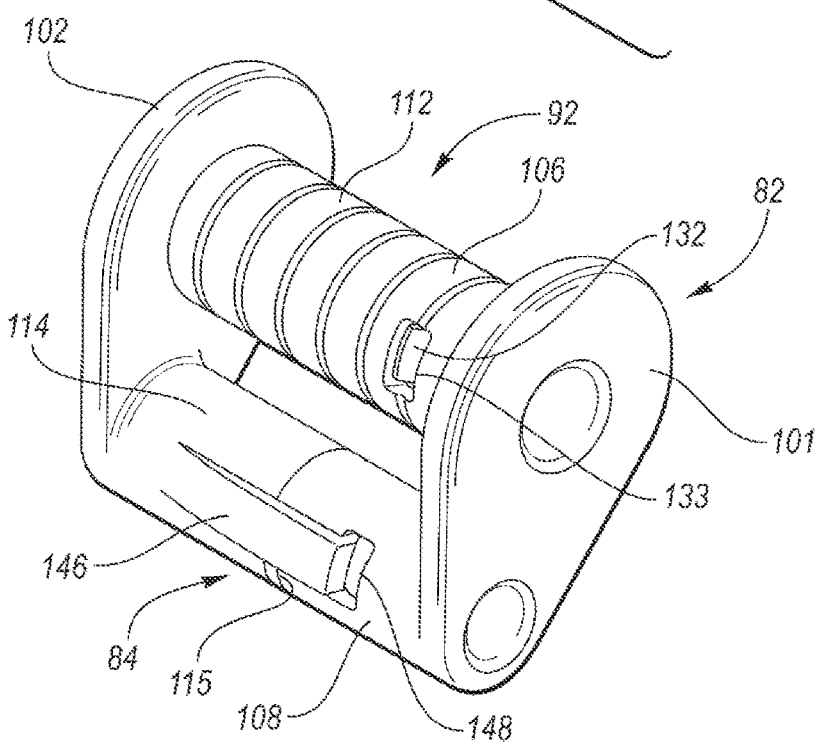
FIG. 5 is a perspective view of the clevis.

Referring to FIGS. 4 and 5, the clevis 82 may be a multi-part assembly that snap fits together. The clevis 82 may include a first piece 101 and a second piece 102. The first and second pieces may be first and second halves. In some embodiments, the first and second pieces 101, 102 may be substantially identical. The first piece 101 includes a base 104 and first and second circumferential projections 106, 108 extending therefrom. One or both of the circumferential projections 106, 108 may be hollow. The second piece 102 also includes a base 110 and first and second circumferential projections 112, 114 extending therefrom. One or both of the circumferential projections 112, 114 may be hollow. The circumferential projections 106 and 112 connect to form the axle 92, and the circumferential projections 108 and 114 cooperate to form the cable connection 84. For example, the circumferential projections 108, 114 are hollow and define a cavity 116 that receives the cable end fitting 68. Cutouts 115 may be provided to provide clearance for the wire 65.

The clevis 82 may include one or more clips to snap-fit the first piece 101 to the second piece 102. For example, the first projection 106 may include a first clip 120 that extends through the hollow center 122 of the projection 106. The clip 120 includes a stem 124 and a head 126. The clip 120 is longer than the first projection 106 so that it extends into the hollow center 121 of the projection 112. The projection 112 defines an opening 130 that engages with the head 126 to form the snap-fit. The projection 112 may include a second clip 132 that is similar to the first clip 120. The second clip 132 engages with an opening 133 defined in the projection 106 as described above.

The projections 108 and 114 may also include one or more clips, however, unlike the clips 120 and 132, the clips associated with the projections 108 and 114 are external so that the cable and can be received within the hollow centers. For example, the projection 108 includes a clip 140 that extends past the end face 142 of the projection 108 to engage with an opening 144 defined in the projection 114. The projection 114 may also include a clip 146 that is similar to the clip 140 as described above and engages with opening 148. The clips are but one embodiment for joining the clevis pieces and in other embodiments, the clevis pieces may be joined by bonding, fasteners, or the like. Moreover, the above-described clips are only one example arrangement and other clip arrangements or other snap-fits are contemplated.

The above-described pull-strap assembly utilizes a pulley system to gain mechanical advantage rather than using a traditional lever arrangement. The pulley system is a more cost-efficient assembly that reduces packaging space and complexity compared to known lever designs. As an example, the first piece 101 and the second piece 102 of the clevis 82 may be formed by one mold (e.g., injection molding mold). The use of one mold as opposed to two or more molds may increase economies of scale and reduce required investment costs to purchase unique molds for the first and second pieces 101, 102. Additionally, the cable end fitting and the drum pulley serve as locators during installation, which eliminates the need for any additional locating pins in either the clevis or the housing. Furthermore, the clevis acts as a guide to protect the pull strap from dragging against sides of the housing or cover while also keeping the cable wire parallel during pulling action. This streamlines forces for mechanical efficiency.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

PARTS LIST 20 vehicle seat
22 seat bottom
24 seat back
25 upper portion
26 recline mechanism
28 pull strap
30 top
32 cable
34 pull-strap assembly
40 housing
42 mounting portion
44 frame
46 fastener
48 cover
52 clips
54 flexible connection
58 cavity
60 bottom wall
62 outer sleeve
63 end connector
64 groove
65 wire
66 cable opening
68 cable end fitting
70 anchor
72 end
74 loop
76 upper wall
78 slot
80 free end
82 clevis
84 cable connection
86 connection
88 intermediate portion
90 first direction
92 axle
94 pulley
96 hollow cylindrical body
98 outer circumferential surface
100 inner circumferential surface
101 first piece
102 second pieces
104 base
106 projection
108 projections
110 base
112 projection
114 projection
115 cutouts
116 cavity
120 first clip
121 hollow center
122 hollow center
124 stem
126 head
130 opening
132 second clip
133 opening
140 clip
142 end face
144 opening
146 clip
148 opening While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A pull-strap assembly for actuating a recline mechanism of a vehicle seat, the pull-strap assembly comprising:
    a housing defining an interior;
    a clevis disposed in the interior and configured to move along a first axis, the clevis having a cable connection and defining an axle extending along a second axis that is orthogonal to the first axis;
    a pulley rotatably supported on the axle;
    a fixed anchor; and
    a tension member having a fixed end connected to the fixed anchor, an intermediate portion trained around the pulley, and a free end disposed outside of the housing and configured to be pulled by a user, wherein the pulley is configured to rotate about the axle, and the clevis is configured to move along the first axis responsive to movement of the free end away from the housing.

2. The pull-strap assembly of claim 1, wherein the tension member is a strap.

3. The pull-strap assembly of claim 1, wherein the fixed anchor is attached to the housing.

4. The pull-strap assembly of claim 1, wherein the clevis includes a first piece and a second piece that snap-fit together.

5. The pull-strap assembly of claim 4, wherein the first and second pieces define first and second cylindrical projections, respectively, that cooperate to form the axle when the first and second pieces are connected.

6. The pull-strap assembly of claim 5, wherein the first piece includes a clip extending through a hollow interior of the first cylindrical projection, and the second cylindrical projection defines an opening that receives a head of the clip to form at least a portion of the snap-fit.

7. The pull-strap assembly of claim 5, wherein the first and second pieces define third and fourth hollow cylindrical projections, respectively, wherein the cable connection is an interior formed by the third and fourth hollow cylindrical projections.

8. The pull-strap assembly of claim 7, wherein the third cylindrical projection includes a clip that is received in an opening defined in the fourth cylindrical projection.

9. The pull-strap assembly of claim 1, wherein the fixed anchor is a post, and the fixed end of the tension member includes a loop received on the post.

10. The pull-strap of claim 1, wherein the pulley includes a cylindrical body having an outer circumferential surface disposed against the intermediate portion and an inner circumferential surface disposed on the axle.

11. A pull-strap assembly for actuating a recline mechanism of a vehicle seat, the pull-strap assembly comprising:
a clevis including first and second pieces configured to snap into one another, wherein the pieces cooperate to define a cylindrical body and a cable connector;
a fixed anchor; and
a tension member having a fixed end connected to the fixed anchor, an intermediate portion looped around the cylindrical body, and a free end, wherein the clevis is configured to move towards the fixed anchor responsive to the free end being pulled by a user to release the recline mechanism.

12. The pull-strap assembly of claim 11, wherein the tension member is a strap.

13. The pull-strap of claim 11 further comprising a pulley rotatably supported on the cylindrical body and including an outer circumferential surface disposed against the intermediate portion.

14. The pull-strap assembly of claim 11, wherein the first and second pieces define first and second cylindrical projections, respectively, that cooperate to form the cylindrical body when the first and second pieces are connected.

15. The pull-strap assembly of claim 14, wherein the first piece includes a clip extending through a hollow interior of the first cylindrical projection, and the second cylindrical projection defines an opening that receives a head of the clip.

16. A vehicle seat comprising:
a seat bottom;
a seat back pivotally connected to the seat bottom by a recline mechanism;
a cable having a first end connected to the recline mechanism and a second end; and
a release assembly associated with the recline mechanism, the release assembly including:
a housing,
a clevis disposed in the housing and having a first portion connected to the second end of the cable and defining an axle,
a pulley rotatably supported on the axle,
an anchor, and
a tension member having a fixed end connected to the fixed anchor, an intermediate portion trained around the pulley, and a free end disposed outside of the housing and configured to be pulled by a user, wherein movement of the free end away from the housing causes the clevis to move towards the fixed anchor to actuate the cable and release the recline mechanism.

17. The vehicle seat of claim 16, wherein the tension member is a strap.

18. The vehicle seat of claim 16, wherein the clevis is movable within the housing along a first direction, and wherein the axle extends in a second direction that is orthogonal to the first direction.

19. The vehicle seat of claim 16, wherein the clevis includes a first piece and a second piece that snap-fit together.

20. The vehicle seat of claim 19, wherein the first and second pieces define first and second cylindrical projections, respectively, that cooperate to form the axle when the first and second pieces are connected, and wherein the first piece includes a clip extending through a hollow interior of the first cylindrical projection, and the second cylindrical projection defines an opening that receives a head of the clip to form at least a portion of the snap-fit.

* * * * *